United States Patent
Coquel

(10) Patent No.: US 10,807,323 B2
(45) Date of Patent: Oct. 20, 2020

(54) MANUFACTURE OF OBJECTS HAVING A FIBER-REINFORCED REGION

(71) Applicant: AIRBUS DEFENCE AND SPACE GMBH, Taufkirchen (DE)

(72) Inventor: Maxime Coquel, Munich (DE)

(73) Assignee: Airbus Defence and Space GmbH, Taufkirchen (DE)

( * ) Notice: Subject to any disclaimer, the term of this patent is extended or adjusted under 35 U.S.C. 154(b) by 58 days.

(21) Appl. No.: 15/268,043

(22) Filed: Sep. 16, 2016

(65) Prior Publication Data

US 2017/0080649 A1 Mar. 23, 2017

(30) Foreign Application Priority Data

Sep. 18, 2015 (DE) .................. 10 2015 115 793

(51) Int. Cl.
*B29C 70/48* (2006.01)
*B29C 70/54* (2006.01)
(Continued)

(52) U.S. Cl.
CPC .......... *B29C 70/48* (2013.01); *B29C 35/0805* (2013.01); *B29C 45/0005* (2013.01); *B29C 45/14336* (2013.01); *B29C 64/106* (2017.08); *B29C 70/542* (2013.01); *B29C 70/745* (2013.01); *B29C 70/84* (2013.01); *B33Y 80/00* (2014.12); *B29C 2035/085* (2013.01); *B29C 2035/0827* (2013.01); *B29K 2105/08* (2013.01); *B29K 2105/12* (2013.01);
(Continued)

(58) Field of Classification Search
CPC ........ B29C 45/0005; B29C 2045/0006; B29C 2045/0008; B29C 70/48; B29C 70/542; B29C 70/543; B29C 70/745; B29C 70/845; B29C 44/12; B29C 44/32; B29C 2045/1723; B29C 47/1045; B29C 2049/2004; B29C 70/06; B29C 44/1257; B29C 44/334
See application file for complete search history.

(56) References Cited

U.S. PATENT DOCUMENTS 6,364,986 B1 4/2002 Kieronski
7,473,385 B2 1/2009 Stiesdal et al.
(Continued)

FOREIGN PATENT DOCUMENTS

DE 602 10 729 T2 12/2007
DE 10 2010 049 195 4/2012
(Continued)

OTHER PUBLICATIONS

German Office Action for Application No. 10 2015 115 793 dated May 11, 2016.
(Continued)

*Primary Examiner* — Stella K Yi
(74) *Attorney, Agent, or Firm* — Jenkins, Wilson, Taylor & Hunt, P.A.

(57) ABSTRACT

A method suitable for manufacturing complex and stable objects of a wide range of sizes. The method involves producing an object structure by a generative production method and/or by an injection molding method, and producing a fiber-reinforced resin layer in at least one subregion of the object structure.

19 Claims, 3 Drawing Sheets

(51) Int. Cl.
  *B29C 70/74*    (2006.01)
  *B33Y 80/00*    (2015.01)
  *B29C 64/106*   (2017.01)
  *B29C 35/08*    (2006.01)
  *B29C 45/00*    (2006.01)
  *B29C 45/14*    (2006.01)
  *B29C 70/84*    (2006.01)
  *B29K 105/08*   (2006.01)
  *B29K 105/12*   (2006.01)
  *B29K 105/00*   (2006.01)
  *B29L 9/00*     (2006.01)

(52) U.S. Cl.
  CPC ............ *B29K 2105/253* (2013.01); *B29K 2995/0078* (2013.01); *B29L 2009/00* (2013.01)

(56) References Cited

U.S. PATENT DOCUMENTS

| | | | |
|---|---|---|---|
| 2003/0186042 A1 | 10/2003 | Dunlap et al. | |
| 2010/0304170 A1* | 12/2010 | Frederiksen | B29C 65/70 |
| | | | 428/542.8 |
| 2010/0314794 A1 | 12/2010 | Dietrich et al. | |
| 2013/0026338 A1* | 1/2013 | Castle | B22C 9/04 |
| | | | 249/114.1 |
| 2014/0328690 A1 | 11/2014 | Kybelund | |
| 2014/0338815 A1* | 11/2014 | Davis | B29C 33/301 |
| | | | 156/64 |

FOREIGN PATENT DOCUMENTS

| | | | |
|---|---|---|---|
| DE | 102010049195 | * | 4/2012 |
| EP | 2522810 | * | 11/2012 |
| GB | 2 519 134 A | | 4/2015 |
| WO | WO 2017/007321 A1 | | 1/2017 |

OTHER PUBLICATIONS

European Search Report for European Application No. 16 18 8669 dated Mar. 1, 2017.
European Office Action for Application No. 16 18 8669 dated Nov. 13, 2019.
European Office Action for Application No. 16188669.2 dated May 11, 2020.

* cited by examiner

MANUFACTURE OF OBJECTS HAVING A FIBER-REINFORCED REGION

CROSS-REFERENCE TO RELATED APPLICATION

This application claims priority to German Patent Application DE 10 2015 115 793.4 filed Sep. 18, 2015, the entire disclosure of which is incorporated by reference herein.

TECHNICAL FIELD

The disclosure herein relates to a method for manufacturing objects and to an object manufactured by a method of this type.

BACKGROUND

To manufacture objects of a wide range of types, in particular generative production methods are known, in which a plurality of material layers are generated and solidified in succession on the basis of three-dimensional data models. The starting material may be in solid, loose, viscous or liquid form and for example be melted selectively in a powder bed or applied in layers on top of one another in a free space before it is cured.

The material may comprise metal and/or plastics material. A drawback of the known manufacture is that the method is relatively slow. In addition, the use of metal in large objects for manufacture is complex and costly. By contrast, if plastics material is used for large objects of this type, this results in relatively low stability.

SUMMARY

One of the ideas of the present disclosure is to provide a technique which is suitable for manufacturing complex and stable objects of a wide range of sizes. Further, it is an idea to provide relatively light objects which have a high strength at least in a sub-region.

A method according to the disclosure herein comprises producing an object structure by a generative production method and/or by an injection molding method and producing a fiber-reinforced resin layer in at least one sub-region of the object structure.

A method of this type makes possible rapid manufacture even of larger objects which have a high strength in the sub-region as a result of the fiber-reinforced resin layer. In this way, an object to be manufactured can be stabilized in a targeted manner. Manufacturing the object structure by the generative production method or by the injection molding method makes material-saving manufacture of a complex geometric shape possible. In particular, for example at least one functional element such as a thread and/or a retaining element (for example for one or more electronic components) may be integrated into the object structure.

In some embodiments, the object structure is produced having one or more reinforcing webs for strengthening and/or having guides which are designed to direct a flow of resin material and/or an orientation of fiber material in the production of the fiber-reinforced resin layer. Guides of this type may for example comprise at least one wall which defines or even encompasses a pathway. In a further variant, the object structure may be produced having one or more sealed-off air chambers. In this way, in particular in regions of the object which do not require reinforcement from a fiber-reinforced resin layer, a relatively large volume of the object can be generated at a low weight.

The sub-region may for example be arranged on an (inner or outer) surface of the object structure. An embodiment of a method according to the disclosure herein comprises introducing the object structure comprising the fiber-reinforced resin layer into a vacuum sack and curing the fiber-reinforced resin layer in the vacuum sack. In this way, the object structure and the fiber-reinforced resin layer can be pressed together in a simple, cost-effective manner.

In some embodiments, the sub-region is arranged in the interior of the object structure in whole or in part. A variant in which the fiber-reinforced resin layer is produced in a cavity in the object structure in whole or in part is particularly preferred.

An embodiment of this type has the advantage that the object structure comprising the cavity can be produced relatively rapidly and with low material consumption by the generative production method or by injection molding, even in the case of a relatively large spatial extent.

In some embodiments of a method according to the disclosure herein, the production of the fiber-reinforced resin layer comprises injecting resin material into a cavity of this type in the object structure. In particular, this makes complete production of the object structure possible before the resin material is injected into the cavity. In particular, the material used in the generative production method or injection molding method can be cured before the injection, and the object structure can be removed from a device for generative production or from an injection mold before the resin material is injected into the cavity. As a result, the device complexity for the manufacture can be reduced.

Resin material can be injected in this manner by at least one infusion system, which may be integrally formed on the object structure. An infusion system of this type may be generated as part of the object structure by the generative production method or injection molding method. This makes particularly simple shaping of the infusion system possible.

An infusion system for injecting resin material may comprise one or more connecting portions between the cavity and surroundings of the object structure, through which portion or portions the resin material can be introduced and/or air can escape from the cavity. A connecting portion of this type may for example be formed as an air duct or gap. An infusion system may enclose a periphery of the cavity in whole or in part (for example connecting portions may be included at one or more edge points of the cavity (or of a planar extension of the cavity) or a gap which serves as a connection portion and extends annularly around the cavity) and be designed to introduce resin material from the edge of the cavity into the cavity. Alternatively or in addition, the infusion system may be designed to fill the cavity with resin material from the centre thereof.

An infusion system may be designed to remain in the manufactured object. A variant of a method according to the disclosure herein alternatively comprises removing at least part of an infusion system for injecting resin material.

In some embodiments, the object structure comprises a first and a second substructure, and the fiber-reinforced resin layer is produced between the first and the second substructure. As a result, the fiber-reinforced resin layer can be brought into a suitable shape in a particularly simple manner. In addition, an outer surface of the object to be manufactured, which may in this case correspond at least in part to a surface of the object structure, can be given a complex design in a simple manner.

In an embodiment of this type, one of the two substructures may have been prefabricated in advance. As a result, the method can be further accelerated. For example, a substructure prefabricated in this manner may have a geometric shape suitable for a wide range of objects (for example it may comprise a simple board or film which may for example be made of plastics material and/or metal), whilst the other of the two substructures may have a design specific to the object to be manufactured. A substructure prefabricated in this manner may have been manufactured by a non-generative production method, for example by casting, extrusion, calendering or blow molding. Alternatively, the two substructures may be produced by a generative production method, specifically the two substructures may be produced by the same generative production method or by different generative production methods (and/or using the same material or different materials). The first and second substructures may, for example, be rigidly interconnected after the resin material is cured.

In particular, a first substructure of this type may comprise a (for example plate-like) depression and/or recess which is covered by the second substructure or the object structure. Thus, a cavity in which the fiber-reinforced resin layer can be produced can be formed in the object structure in a simple manner.

An embodiment of this type makes particularly simple introduction of fiber material into the cavity possible. In particular, the fiber material can be laid in the depression, and subsequently the second substructure can be produced or connected to the first substructure.

Producing the fiber-reinforced resin layer may comprise spraying resin material onto the sub-region and/or positioning the fiber-reinforced resin layer as a film or mat. In particular, the resin material may be applied or introduced together with the fiber material, for example in the form of a preimpregnated semi-finished product or in the form of resin material mixed with fibers.

The fiber material may for example comprise a roving, a non-woven, a fabric and/or a meshwork. It may be pressed or unpressed and/or for example comprise glass fibers and/or carbon fibers. It may comprise short fibers (0.1-1 mm long), long fibers (1-50 mm) and/or continuous fibers (50 mm or longer). The fibers in the fiber material may be cured or uncured. The fiber material may comprise a mixture of different fibers, for example of different materials and/or of different lengths. By selecting the fiber material accordingly, desired properties of the object to be manufactured can be selectively generated, for example in relation to rigidity and/or (electrical and/or thermal) conductivity.

An embodiment in which the fiber material comprises long fibers is advantageous. As a result, simple introduction of the fiber material into the sub-region (for example into a cavity in the object structure) is achieved, and in addition good rigidity of the fiber-reinforced resin layer and thus of the sub-region of the manufactured object is achieved.

In some embodiments of a method according to the disclosure herein, producing the fiber-reinforced resin layer comprises introducing fiber material into the cavity by pressurized gas and/or together with injected resin material. This makes it possible in particular to introduce the fiber material only after producing the object structure by the generative production method, in such a way that the object structure can be removed from a device before the fiber material is introduced. In an embodiment of this type, in particular the use of short and/or long fibers is advantageous.

Some embodiments of a method according to the disclosure herein comprise polymerizing resin material of the fiber-reinforced resin layer, for example by heat treatment, irradiation with ultraviolet light and/or gamma radiation. In this way, the structure of the fiber-reinforced resin layer can be selectively influenced.

The generative production method may comprise 3D printing by fused deposition modelling using plastics material, synthetic resin and/or composite material. In particular, the object structure can still be produced from a fiber-reinforced plastics material in this way. Relatively high strength and rigidity of the object structure can thus be achieved at a low weight.

In some embodiments of a method according to the disclosure herein, the fiber-reinforced resin layer in the at least one sub-region is produced at a first thickness, using a first resin material, a first fiber material (which may comprise fibers of a first starting material, a first fiber length and/or a first fiber thickness) and/or at a first fiber density. The object structure may in this case comprise a further sub-region, and the method may comprise producing a further fiber-reinforced resin layer in the further sub-region, the further fiber-reinforced resin layer being produced using a second resin and/or fiber material different from the first and/or at a second thickness and/or fiber density different from the first.

In this way, the object for manufacture can be manufactured selectively having intended properties for example as regards the rigidity in the different sub-regions. In particular, the object can be optimally adapted to the requirements that result from the intended use thereof.

Some embodiments of a method according to the disclosure herein comprise connecting at least two object components by way of the object structure and the fiber-reinforced resin layer. In some embodiments, the object structure is positioned against at least one of the object components in a surface portion. The fiber-reinforced resin layer and/or a thermoplastics material that is preferably contained in the object structure may provide an adhesive connection. In some embodiments, the fiber-reinforced resin layer is arranged between the object structure and at least one of the object components at least in portions.

In particular, in this way the object structure and the fiber-reinforced resin layer can be used to anchor the object components together in a solid and durable manner.

In a variant, a method according to the disclosure herein comprises stabilizing an object component by the object structure and the fiber-reinforced resin layer in at least one region; in this case, the object structure is preferably positioned against the object component in a surface portion and the fiber-reinforced resin layer provides an adhesive connection. Thus, an object for manufacture can for example be strengthened selectively in a region which is particularly stressed during the use thereof. Preferably, the fiber-reinforced resin layer is arranged between the object structure and the object component at least in portions.

The fiber-reinforced resin layer may be a part of the object for manufacture. The object structure may also, in whole or in part, be part of the object for manufacture and/or serve as an aid in the manufacture thereof.

In some embodiments of the present disclosure, the object structure and the fiber-reinforced resin layer adhere together in at least one contact region. In particular, in this case the object structure and the fiber-reinforced resin layer are mutually compatible in so far as they bond together, for example in that they chemically interact in a contact region.

In some embodiments, the object structure and the fiber-reinforced resin layer do not adhere in at least one (if applicable further) contact region, and thus do not form a corresponding bond. This makes it possible in particular to remove at least part of the object structure in a simple manner after curing.

An embodiment of a method according to the disclosure herein comprises removing at least part of the object structure after curing the fiber-reinforced resin layer. The removed part of the object structure can thus be used as an aid in the manufacture of the object for manufacture.

In some embodiments of a method according to the disclosure herein, producing the fiber-reinforced resin layer comprises injection pressing, vacuum-assisted infusion of resin material into a shaping tool and/or introduction of a preimpregnated fiber semi-finished product. In an embodiment of this type, the object structure may be formed as a distributing structure and/or as at least part of a vacuum sack for the resin material.

This embodiment thus makes it possible to form the object structure in a manner which is advantageous for producing the fiber-reinforced resin layer. In this way, desired properties of the object for manufacture can be selectively generated.

The object structure may comprise one or more materials such as ceramics, rubber and/or glass.

The object structure may consist of or comprise a plastics material in whole or in part. Thus, even a complex geometric shape of the object structure can be generated in a simple and cost-effective manner, and the object structure in this case has a relatively low weight. In particular, a thermosetting and/or a thermoplastic plastics material may be used. Use of thermoplastic plastics material advantageously makes it possible for example to weld the object structure to another component.

In some embodiments, the object structure comprises at least one metal. Thus, favorable properties of an object for manufacture can be generated at the surface thereof, for example as regards robustness and/or electrical and thermal conductivity. When integrated into the object structure in this manner, these properties scarcely deteriorate, unlike when the object is coated.

An object may be manufactured by a method according to the disclosure herein. In particular, it comprises an object structure manufactured by a generative production method and/or by an injection molding method and comprises a fiber-reinforced resin layer in at least one sub-region of the object structure.

An embodiment in which the fiber-reinforced resin layer is arranged in a cavity in the object structure at least in part is particularly preferred. An object of this type has a high strength at a low weight and can have a specifically generated surface.

An object of this type may comprise at least one further, air-filled cavity. The stabilization by way of the fiber-reinforced resin layer can thus merely be produced in one or more sub-regions which are stressed when the object is used as intended, whilst they can be dispensed with in other regions. Thus, the weight of the object can be further reduced.

BRIEF DESCRIPTION OF THE DRAWINGS

In the following, features of some embodiments of the disclosure herein are described in greater detail by way of drawings. It will be appreciated that the schematically shown individual elements and components may also be combined and/or formed differently from shown and that the present disclosure is not limited to the features shown.

In the drawings, schematically.

DETAILED DESCRIPTION

Figure 1A:
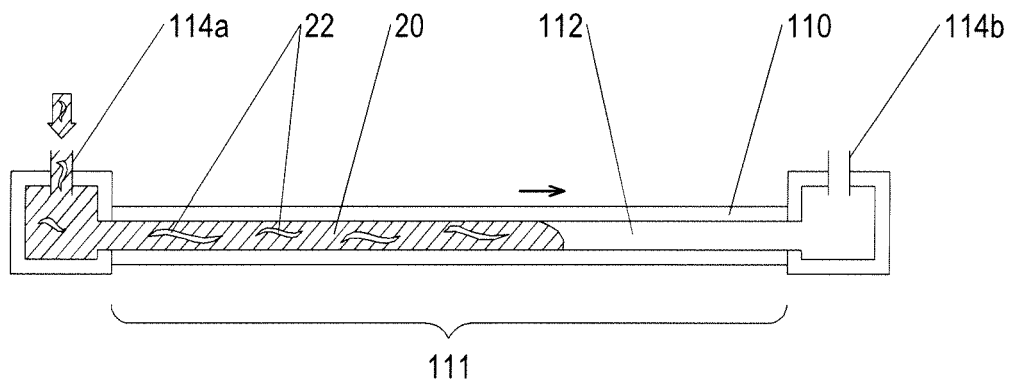
FIG. 1a-1c show manners of production according to the disclosure herein of fiber-containing resin layers in various example object structures.

FIG. 1a is a schematic cross section of an object structure 110 which has been produced according to the disclosure herein (in a step not shown) by a generative production method and/or by an injection molding method. The object structure comprises a cavity 112, which extends in a sub-region 111 of the object structure, and additionally comprises an infusion system 114a, 114b for introducing resin material into the cavity or for letting air out of the cavity. In the example shown in FIG. 1a, the infusion system 114a, 114b is arranged at a periphery of the sub-region 111 in such a way that introduced material can be introduced from an outer edge of the sub-region (or of the cavity). The connecting portions 114a, 114b shown between the cavity 112 and surroundings of the object structure may be mutually separated openings or be connected by an annular gap which passes around the cavity at least in part.

FIG. 1a shows introduction of resin material 20 in this manner along with fibers 22 contained therein in accordance with an embodiment of the method according to the disclosure herein. The introduction takes place through a connecting portion 114a of the infusion system, for example by applied pressure; air or other gas can escape from cavity through an outlet 114b in the infusion system.

Figure 1B:
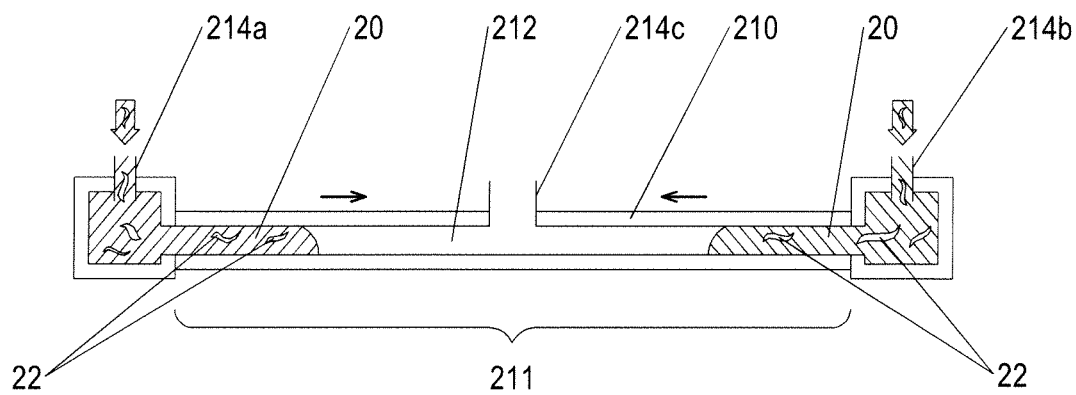

FIG. 1b is a cross section of an object structure 210 which analogously comprises a cavity 212 in a sub-region 211 and has been produced (in a step not shown) by a generative production method and/or by an injection molding method. The object structure 210 comprises an alternative infusion system 214a, 214b, 214c comprising connecting portions 214a, 214b which are arranged at the periphery of the cavity 212 (or of the sub-region 211) (and which connect the cavity 212 to surroundings of the object structure) and additionally comprising a connecting portion 214c in the centre of the cavity (or of the largest extension thereof). The connecting portions 214a, 214b shown may be separated from one another or be connected by an annular gap which passes around the cavity at least in part.

FIG. 1b shows simultaneous introduction of resin material 20 (having fibers 22 contained therein) in accordance with an embodiment of the method according to the disclosure herein through the peripheral connecting portions 214a, 214b of the infusion system. As indicated by the arrows, the resin material 20 propagates in the cavity 210. Meanwhile, air can escape through the connecting portion 214c.

Figure 1C:
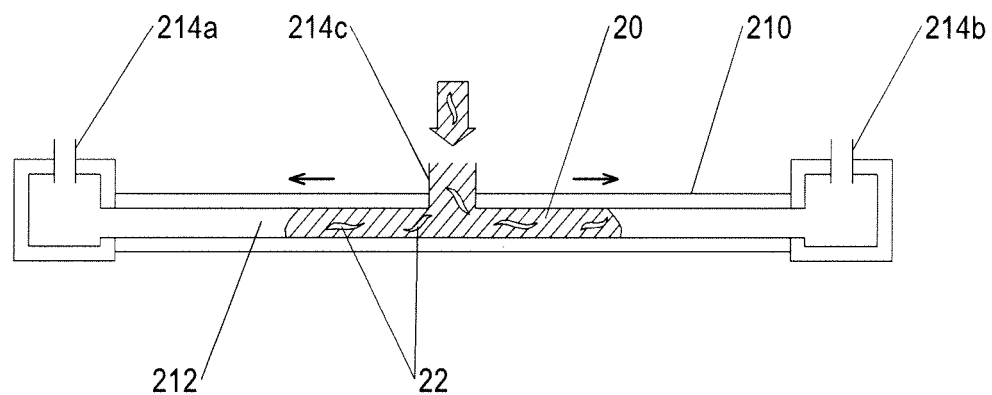

FIG. 1c shows the same object structure 210 as in FIG. 1b, into which resin material 20 (having fibers 22 contained therein) is introduced in accordance with an alternative embodiment of a method according to the disclosure herein. In this case, the introduction takes place through the connecting portion 214c in such a way that the resin material propagates outwards from the centre of the cavity (as indicated by the arrows). Air can escape from the cavity through the connecting portions 214a, 214b.

The infusion systems shown in the drawings may each be integrated into the object for manufacture as part thereof or be removed at least in part after the resin material is introduced or after it is cured.

Figure 2:
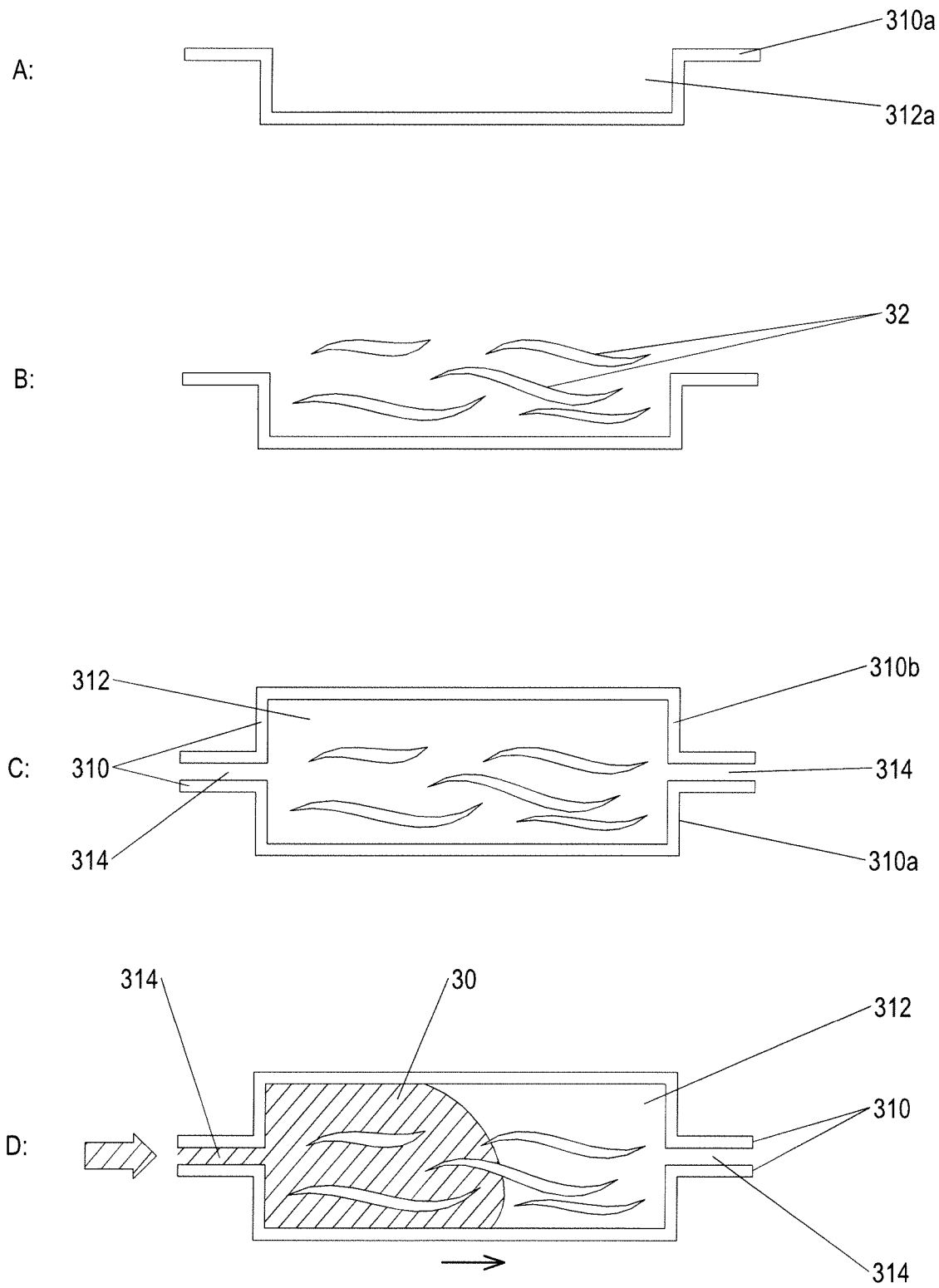
FIG. 2 shows four steps A-D of an example method according to the disclosure herein.

FIG. 2 shows method steps A-D of an example method according to the present disclosure; the steps A-C are each shown after completion. In step A, a first substructure 310*a* of an object structure has been produced by a generative production method and/or by an injection molding method. The substructure 310*a* comprises a depression (or recess) 312*a*, in which (for example dry) fiber material 32 has been arranged in step B. In step C, the depression 312*a* of the first substructure 310*a* having the fiber material 32 arranged therein has been covered by a second substructure 310*b*; together, the substructures 310*a*, 310*b* form an object structure 310 having a cavity 312 in the interior thereof which is formed in part by the depression 312*a*. When covering the depression by the second substructure 310*a*, an infusion system 314 was formed through which resin material can be injected into the cavity.

The second substructure 310*b* may be prefabricated, for example in a standardised mold suitable for manufacturing objects of various types. As a result, rapid manufacture of the object can be provided. It may be or have been generated by a non-generative production method, for example by casting, extrusion, calendering or blow molding.

Alternatively, the second substructure may be constructed on the first substructure 310*a* in layers by a generative production method after the fiber material is arranged in the depression 312*a*; this makes possible, in a simple manner, a specific geometric shaping of the second substructure and low-wear manufacture. The generative production method for the second substructure 310*a* may be the same as that used for producing the first substructure 310*a* or a different method, for example it can comprise use of a different material from that used for producing the first substructure.

In step D, resin material 30 is introduced or pressed into the cavity 312 of the object structure 310 having the fiber material 32 located therein through the infusion system 314. After the resin material is cured, this results in a fiber-reinforced resin layer in the cavity.

Figure 3:
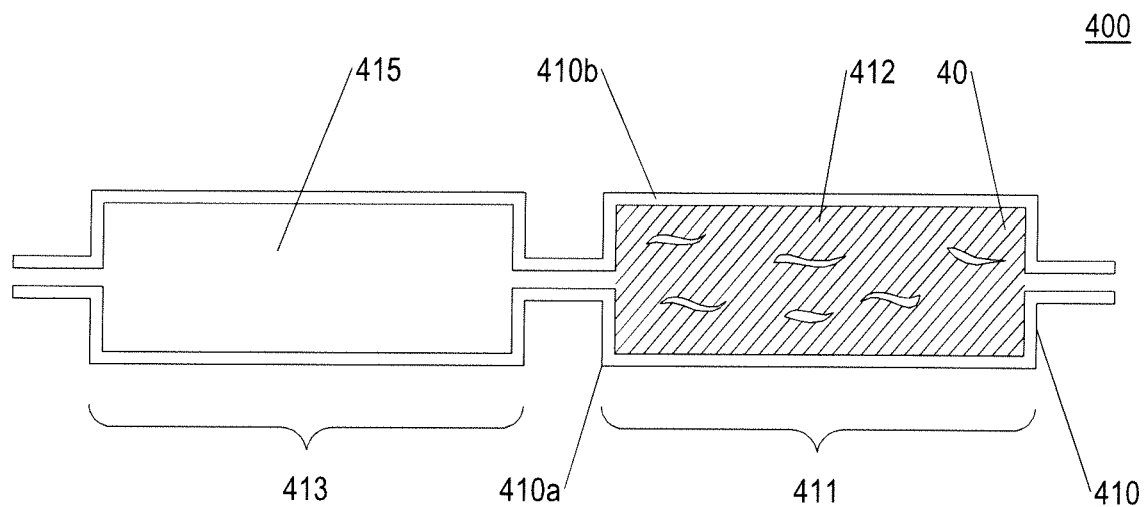
FIG. 3 shows an example object according to the disclosure herein.

FIG. 3 is a schematic cross section of an object 400 according to an embodiment of the present disclosure. The object 400 comprises an object structure 410, which has been produced by a generative production method and/or an injection molding method. The object structure 410 comprises a first substructure 410*a*, which comprises depressions that are covered by a second substructure 410*b*, which also comprises depressions. In this way, there are two cavities 412, 415 formed in the object structure 410.

A first cavity 412 is filled with fibers and a resin material, and as a result a fiber-reinforced resin layer 40 has been produced in a first sub-region 411 of the object structure 410. Thus, the object 400 has increased stability and rigidity in the first sub-region 411. By contrast, the second cavity 415 is filled with gas, for example, air, and this may be expedient in particular if the second sub-region 413 is not exposed to any particular stress in an intended use of the object 400. As a result of the gas filling, the object 400 has a relatively low weight.

Figure 4:
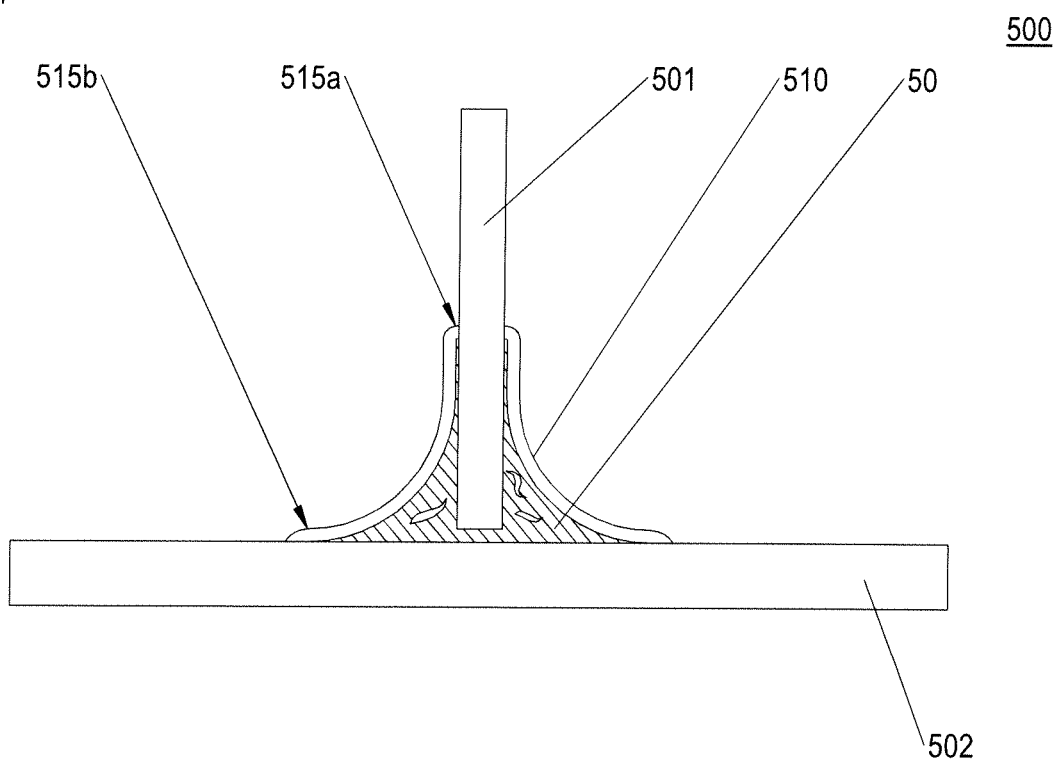
FIG. 4 shows a further example object according to the disclosure herein.

FIG. 4 is a cross section of an alternative object 500 in accordance with an embodiment of the present disclosure. The object 500 comprises object components 501, 502 which are stably interconnected by an object structure 510 and a fiber-reinforced resin layer 50. The object structure 510 is produced by a generative production method and/or an injection molding method. It comprises regions 515*a*, 515*b* in which it is positioned against the object components 501, 502. For example, the object structure 510 may at least in part comprise a thermoplastic material, which, when heated and soft, is adapted to and welded to the object components 501, 502 in the regions 515*a*, 515*b*. Alternatively or in addition, the resin material in the fiber-reinforced resin layer 50 may be used for gluing the object structure 510 to the object components 501, 502. In the embodiment shown, the fiber-reinforced resin layer 50 is arranged between the object components 501, 502 and the object structure 510, forming a cavity filled with the fiber-reinforced resin layer 50.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for manufacturing objects, the method comprising:
producing a first substructure by a generative production method and/or by an injection molding method;
producing, after the first substructure is produced, a second substructure by the generative production method and/or by the injection molding method, wherein the first substructure and/or the second substructure comprise a recess;
covering the first substructure with the second substructure, so that the recess of the first substructure and/or the recess of the second substructure define a cavity, at least in part, to form an object structure;
introducing a resin material and a fiber material into the cavity of the object structure; and
curing the resin material within the cavity to form a fiber-reinforced resin layer in the object structure;
wherein the object structure has at least first and second sub-regions, wherein the fiber-reinforced resin layer is produced to have a different thickness in the first sub-region, using a different resin material and/or a different fiber material from the resin material and/or fiber material, respectively, than in the second sub-region, and/or
wherein the fiber-reinforced resin layer is produced to have a different fiber density in the first sub-region than in the second sub-region.

2. The method of claim 1, wherein the first substructure and the second substructure each comprise a recess, and wherein the cavity is formed by the recess of the first substructure and the recess of the second substructure.

3. The method of claim 1, wherein the fiber material is introduced into the cavity before the resin material is introduced into the cavity.

4. The method of claim 1, wherein, when the first substructure is covered by the second substructure, an infusion system is formed integrally with the object structure, and wherein the resin material is injected using the infusion system.

5. The method of claim 1, wherein the fiber material is introduced into the cavity using pressurized gas and/or together with the resin material.

6. The method of claim 1, comprising applying the fiber material within the recess of the first substructure and/or the second substructure before the first substructure is covered by the second substructure, wherein the second substructure comprises a film.

7. The method of claim 1, comprising polymerizing the resin material.

8. The method of claim 7, wherein polymerizing the resin material is performed by one of heat treatment, irradiation with ultraviolet light, and irradiation with gamma radiation.

9. The method of claim 1, wherein the generative production method comprises 3D printing by fused deposition modelling using plastics material, synthetic resin, and/or composite material.

10. The method of claim 1, wherein the object structure and the fiber-reinforced resin layer interconnect two or more object components and/or stabilize at least one region of an object component.

11. The method of claim 1, wherein introducing the resin material into the cavity of the object structure comprises injection pressing and/or vacuum-assisted infusion of the resin material into a shaping tool, wherein the object structure is a structure that distributes the resin material.

12. The method of claim 1, wherein the object structure and the fiber-reinforced resin layer adhere to each other in at least one contact region and/or do not adhere to each other in at least one contact region.

13. The method of claim 1, comprising, after the resin material is cured within the cavity, removing at least part of the object structure from the fiber-reinforced resin layer.

14. An object manufactured by a method comprising:
producing a first substructure by a generative production method and/or by an injection molding method;
producing, after the first substructure is produced, a second substructure by the generative production method and/or by the injection molding method, wherein the first substructure and/or the second substructure comprise a recess;
covering the first substructure with the second substructure, so that the recess of the first substructure and/or the recess of the second substructure define a cavity, at least in part, to form an object structure;
introducing a resin material and a fiber material into the cavity of the object structure; and
curing the resin material within the cavity to form a fiber-reinforced resin layer in the object structure;
wherein the object structure has at least first and second sub-regions, wherein the fiber-reinforced resin layer is produced to have a different thickness in the first sub-region, using a different resin material and/or a different fiber material from the resin material and/or fiber material, respectively, than in the second sub-region, and/or
wherein the fiber-reinforced resin layer is produced to have a different fiber density in the first sub-region than in the second sub-region.

15. The method of claim 1, wherein the fiber material is introduced into the cavity at a same time as injected resin material.

16. The method of claim 1, wherein introducing the fiber material into the cavity of the object structure comprises applying fiber material to the first substructure, after which the first substructure is covered by the second substructure.

17. The method of claim 1, wherein introducing the resin material into the cavity of the object structure comprises injection pressing the resin material into a shaping tool, wherein the object structure is a structure that distributes the resin material.

18. The method of claim 1, wherein the object structure and the fiber-reinforced resin layer do not adhere to each other in at least one contact region.

19. A method for manufacturing objects, the method comprising:
producing a first substructure by a generative production method and/or by an injection molding method;
producing, after the first substructure is produced, a second substructure by the generative production method and/or by the injection molding method, wherein the first substructure and/or the second substructure comprise first and second recesses;
covering the first substructure with the second substructure, so that the first recess of the first substructure and/or the first recess of the second substructure define a first cavity, at least in part, and so that the second recess of the first substructure and/or the second recess of the second substructure define a second cavity, thereby forming an object structure, wherein the first cavity is in a first sub-region of the object structure and the second cavity is in a second sub-region of the object structure; and
introducing a first resin material and a first fiber material into the first cavity of the object structure;
introducing a second resin material and a second fiber material into the second cavity of the object structure;
curing the first resin material within the first cavity to form a first fiber-reinforced resin layer in the first sub-region of the object structure; and
curing the second resin material within the first cavity to form a second fiber-reinforced resin layer in the second sub-region of the object structure;
wherein, when the first resin material is different from the second resin material and/or the first fiber material is different from the second fiber material, the first fiber-reinforced resin layer has a thickness that is different from a thickness of the second fiber-reinforced resin layer; and/or
wherein the first fiber-reinforced resin layer has a fiber density that is different from a fiber density of the second fiber-reinforced resin layer.

* * * * *